United States Patent
Otto

(10) Patent No.: US 6,389,397 B1
(45) Date of Patent: May 14, 2002

(54) USER IDENTIFICATION SYSTEM USING IMPROVED VOICE PRINT IDENTIFICATION PROCESSING

(75) Inventor: Mary Rita Otto, Lisle, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/220,254

(22) Filed: Dec. 23, 1998

(51) Int. Cl.[7] ............................................... G10L 21/00
(52) U.S. Cl. ....................................... 704/270; 704/273
(58) Field of Search ................................. 704/270, 273, 704/275, 231, 246

(56) References Cited

U.S. PATENT DOCUMENTS

| | | | | | |
|---|---|---|---|---|---|
| 4,881,266 A | * | 11/1989 | Nitta et al. | ..................... | 381/43 |
| 5,311,175 A | * | 5/1994 | Waldman | ...................... | 341/34 |
| 5,475,740 A | * | 12/1995 | Biggs, Jr. et al. | ............. | 379/91 |
| 5,497,411 A | * | 3/1996 | Pellerin | ........................ | 379/59 |
| 5,537,102 A | * | 7/1996 | Pinnow | ...................... | 340/825.3 |
| 5,548,647 A | * | 8/1996 | Naik et al. | ..................... | 381/42 |
| 5,586,171 A | * | 12/1996 | McAllister et al. | ........... | 379/67 |
| 5,717,743 A | * | 2/1998 | McMahan et al. | .......... | 379/188 |
| 5,774,858 A | * | 6/1998 | Taubkin et al. | ............. | 704/273 |
| 5,848,231 A | * | 12/1998 | Teitelbaum et al. | ......... | 395/186 |
| 6,038,528 A | * | 3/2000 | Mammone et al. | ......... | 704/203 |
| 6,092,192 A | * | 7/2000 | Kanevsky et al. | .......... | 713/186 |
| 6,101,378 A | * | 8/2000 | Barabash et al. | ........... | 455/406 |

* cited by examiner

Primary Examiner—Marsha D. Banks-Harold
Assistant Examiner—Michael N. Opsasnick
(74) Attorney, Agent, or Firm—Patton Boggs

(57) ABSTRACT

The system for improved voice print identification divides the user identification validation process into multiple steps: presorting the prestored user identity validation data based upon a user provided voice input to produce a subset of user identity validation data, and processing the identified subset of the user identity validation data using a voice print identification system. This system implements the multiple step user identification validation process by converting a user provided voice input into a text stream, which is used to sort through the stored user identity validation data to create a subset of stored user identity validation data that comprises one or more of the data entries that likely correspond to the user provided voice input. The voice print identification system is then activated to compare a user provided voice input to the selected subset of stored user identity validation data to validate the identity of the user who is requesting access.

16 Claims, 3 Drawing Sheets

USER IDENTIFICATION SYSTEM USING IMPROVED VOICE PRINT IDENTIFICATION PROCESSING

FIELD OF THE INVENTION

This invention relates to user identification systems and, in particular, to a user identification system that improves the speed of operation of a voice print system without reducing the accuracy of the voice print recognition process to provide fast, highly reliable and accurate user identification validation.

PROBLEM

It is a problem in user identification systems to provide a balance between the accuracy of the user identification validation process and the speed of operation. Many user identification systems comprise simple password systems, where the user provides a password, or keypunches in a multi-character alphanumeric code to obtain access to the system. Such systems are subject to unauthorized users thwarting the security by means of a number of well known "code-breaking" procedures. Thus, convenience of use is paramount in such systems and security is a secondary consideration.

Where additional security is required, more stringent user screening methods are provided. For example, a high degree of security is desired to prevent unauthorized access to a secure facility or to a computer/data storage system in such a facility that contains highly confidential or sensitive data. A user wishing to access such a facility or computer/data storage system must have their identity validated in a highly reliably manner. The most accurate forms of positive user identification involve the determination of an immutable physical characteristic of the user, which characteristic is unique to the user. Such systems include: retina scan systems, voice print identification systems, fingerprint identification systems, and the like. However, it is a problem that such system require a significant amount of time to perform the user identification processing.

A voice print identification system is a particularly effective user identification system since the user validation process is highly accurate and positively identifies an individual based upon the use of a predetermined user provided identifying phrase, while the user does not have to be physically present at the secure computer/data storage system to obtain access. In particular, the user initially inputs a predetermined spoken phrase into the voice print identification system for use as the "benchmark" against which all future user accesses are measured. Each time the user wishes to access the computer/data storage system that is protected by the voice print identification system, the user must speak the predetermined phrase into the voice print identification system, where it is compared against the stored benchmark phrase. The user can provide this voice input over a call connection on a telecommunication network to thereby obtain remote access to the secure computer/data storage system. The voice print identification system is immune to variations in the user's voice and cannot be thwarted by imitators. A difficulty with such a system is that when there are numerous users, the time required to sequence through the large number of stored benchmark phrases and perform the voice print identification process is time consuming and can increase the response time of the voice print identification system to an unacceptable level. This problem prevents voice print identification technology from being practical in the field of remote access systems, where the user accesses the desired system via a telecommunication network voice connection, and there are very large numbers of users who initiate frequent accesses to the desired system.

SOLUTION

The above-described problems are solved and a technical advance achieved in the field by the present system for improved voice print identification that uses a multiple step voice activated user identification process. This system divides the user identification validation process into at least two steps: presorting the prestored user identity validation data based upon a user provided voice input to produce a subset of user identity validation data, and processing the identified subset of the user identity validation data using a voice print identification system. This system implements the multiple step user identification validation process by converting a user provided voice input into a text stream, which is used to sort through the stored user identity validation data to create a subset of stored user identity validation data that comprises one or more of the data entries that likely correspond to the user provided voice input. The voice print identification system is then activated to compare a user provided voice input to the selected subset of stored user identity validation data to validate the identity of the user who is requesting access.

This multiple step user identity validation process can be implemented in a number of ways. The user can input a single voice input, which voice input is used for both a sort key and a voice print identifying phrase or the user can input separate sort key and voice print identifying phrases. In either case, the sort key is stored and converted by a voice to text conversion system into a text string. The text string is then used by the system for improved voice print identification to sort through the stored voice print data to locate the one (or a small subset) of the stored voice print identification phrases that use the sort key. The second step of this process uses the voice print identification phrase to verify the identity of the user. Thus, by using a user provided sort key, the voice print identification process must process only one or at most a small number of stored voice print identification phrases to complete the user identification validation. In addition, multiple layers of security can be provided wherein a separate user provided voice input is required for each level of security that is traversed. Alternatively, the user provided voice input can be used by the system for improved voice print identification as a routing mechanism to direct the user to one of a plurality of destinations which the user is authorized to access. Thus, the system for improved voice print identification would store multiple sort keys and/or voice print identification phrases to enable a one to many routing of the user to authorized destinations.

This capability of the system for improved voice print identification enables the use of voice print identification as a user validation process in the field of remote access systems, where the user is connected to the remote access system via a voice connection on a telecommunication network, data network, or Internet. The user can be prompted to speak the sort key, such as their name, into the telephone, and then their unique voice print identifying phrase to thereby obtain secure access to the desired system. This eliminates the need for account numbers or typed passwords, that can be misappropriated by unauthorized users to gain access to the desired system. This system for improved voice print identification also enables the creation of "voice calling cards," simpler access to all private user services, as well as simple access to services by the visually impaired or many other types or impaired users, since the entire access routine is voice activated. Furthermore, the system for improved voice print identification can be used for hands free communication applications, such as clean room communications, or voice activated premises access control systems.

DETAILED DESCRIPTION

Figure 1:
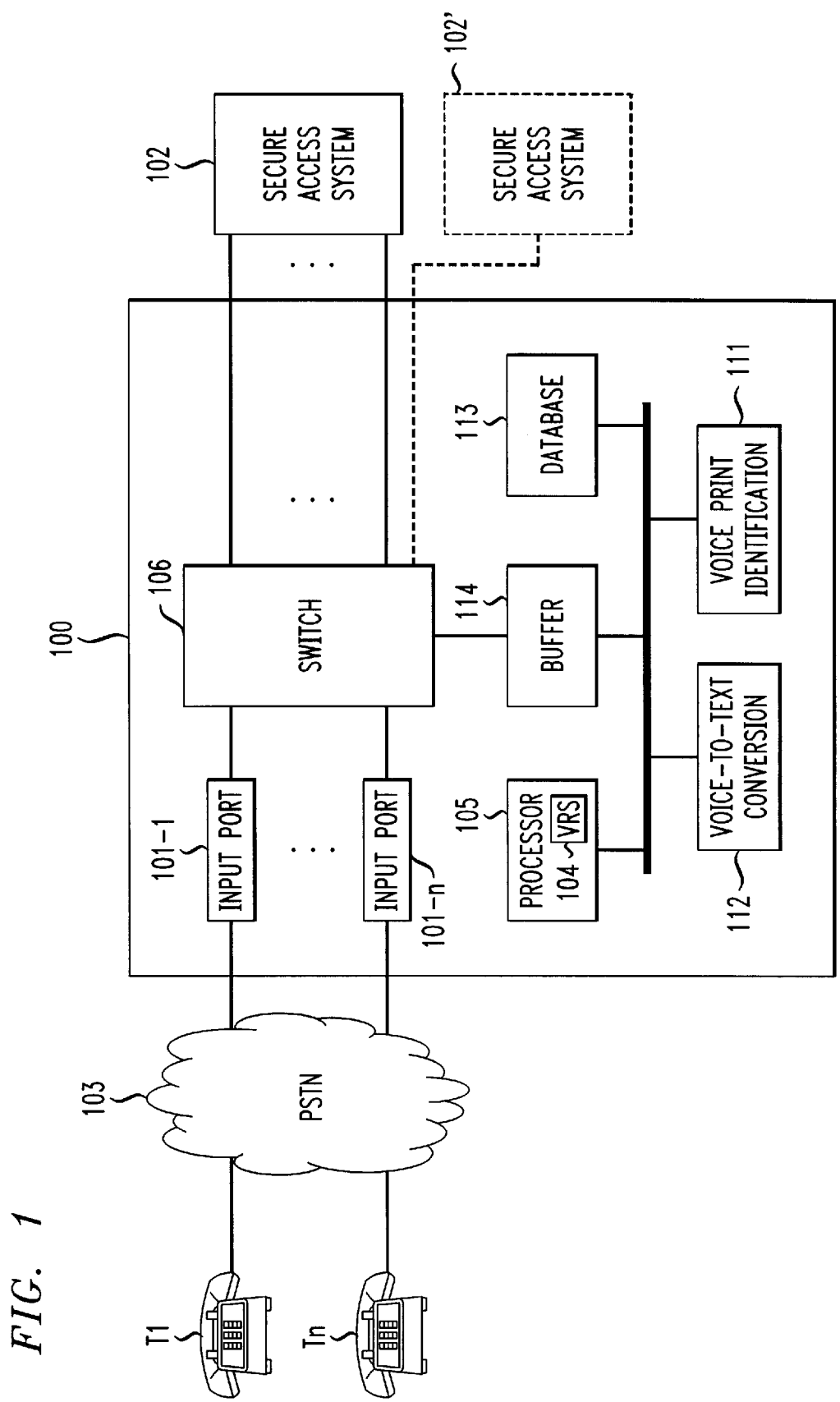
FIG. 1 illustrates in block diagram form the overall architecture of the present system for improved voice print identification and an environment in which it is operational.

FIG. 1 illustrates in block diagram form the overall architecture of the present system for improved voice print identification and an environment in which it is operational. As shown in FIG. 1, the present system for improved voice print identification 100 serves to interface a plurality of input ports 101-1 to 101-n with a secure access system 102. In one embodiment, the input ports 101-1 to 101-n can be security doorways into a secure facility and the secure access system 102 can be the secure facility itself. In this application, the present system for improved voice print identification 100 functions to control the door locks on the security doorways that are used to enable entry into the secure facility.

Due to the potential number and diversity of applications and embodiments of the present system for improved voice print identification, a single embodiment is selected for the following description to illustrate the operational concepts of the system and this example is not intended to limit the scope of the concept as defined in the claims appended hereto.

Typical Operating Environment of the System for Improved Voice Print Identification The embodiment of the system for improved voice print identification 100 described herein comprises a remote access system wherein a plurality of users T1–Tm can access a secure access system 102 (or a selected one of a plurality of such systems as suggested by secure access system 102'), such as a computer system, a data storage facility, a credit card authorization facility, banking facility, or the like, via a voice connection through a communication network 103, which can be the Internet, a data network or the Public Switched Telephone Network (PSTN). The particular embodiment also uses two user provided voice inputs (instead of the one as noted above. The communication network 103 interconnects the users with input ports 101-1 to 101-n (access lines) of the system for improved voice print identification 100 in well known fashion. The user's call connection is processed by the system for improved voice print identification 100 to interconnect with a voice response system 104, that can be embedded in processor 105, to thereby enable the system for improved voice print identification 100 to provide the user with operating instructions in the form of a predetermined sequence of voice prompts, as is well known in the field of telecommunications. The voice prompts instruct the user to provide a sort key phrase and then a voice print identifying phrase to enable the system for improved voice print identification 100 to provide a positive identification of the user in an efficient timely manner. The verification of the user's identity results in the user being provided with direct access to the secure access system 102 via switch 106.

Architecture of the System for Improved Voice Print Identification

The system for improved voice print identification 100 comprises a number of elements, which can be implemented as separately operational apparatus, or can be integrated into a lesser number of elements. The particular assemblage of elements disclosed herein has been selected to simplify the description of the various functional elements that are included in the system for improved voice print identification 100 and it is expected that efficiencies can be obtained by combining some of these elements.

The system for improved voice print identification 100 includes a plurality of input ports 101-1 to 101-n, each of which serves to terminate a corresponding line from communication network 103 to thereby enable a user to access the system for improved voice print identification 100 via a communication network 103, such as the Public Switched Telephone Network (PSTN), in well known fashion. The input ports 101-1 to 101-n are connected by switch 106 to the secure access system 102 to enable the user, once their identity is validated, to access the secure access system 102. The system for improved voice print identification 100 provides the functionality to provide the user identity validation in an accurate, yet efficient manner. This is accomplished by using a two-step user identification process that combines a voice print identification system 111 with a voice to text conversion system 112. The voice to text conversion system 112 functions to presort the voice print identification phrases to thereby reduce the number of possible users to a single user or at worst a small subset of users who have registered with the system for improved voice print identification 100. By reducing the number of potential users that the vice print identification system 111 must decide among, the operation of the overall system is much faster than existing stand alone voice print identification system.

Operation of the System for Improved Voice Print Identification

Figure 2:
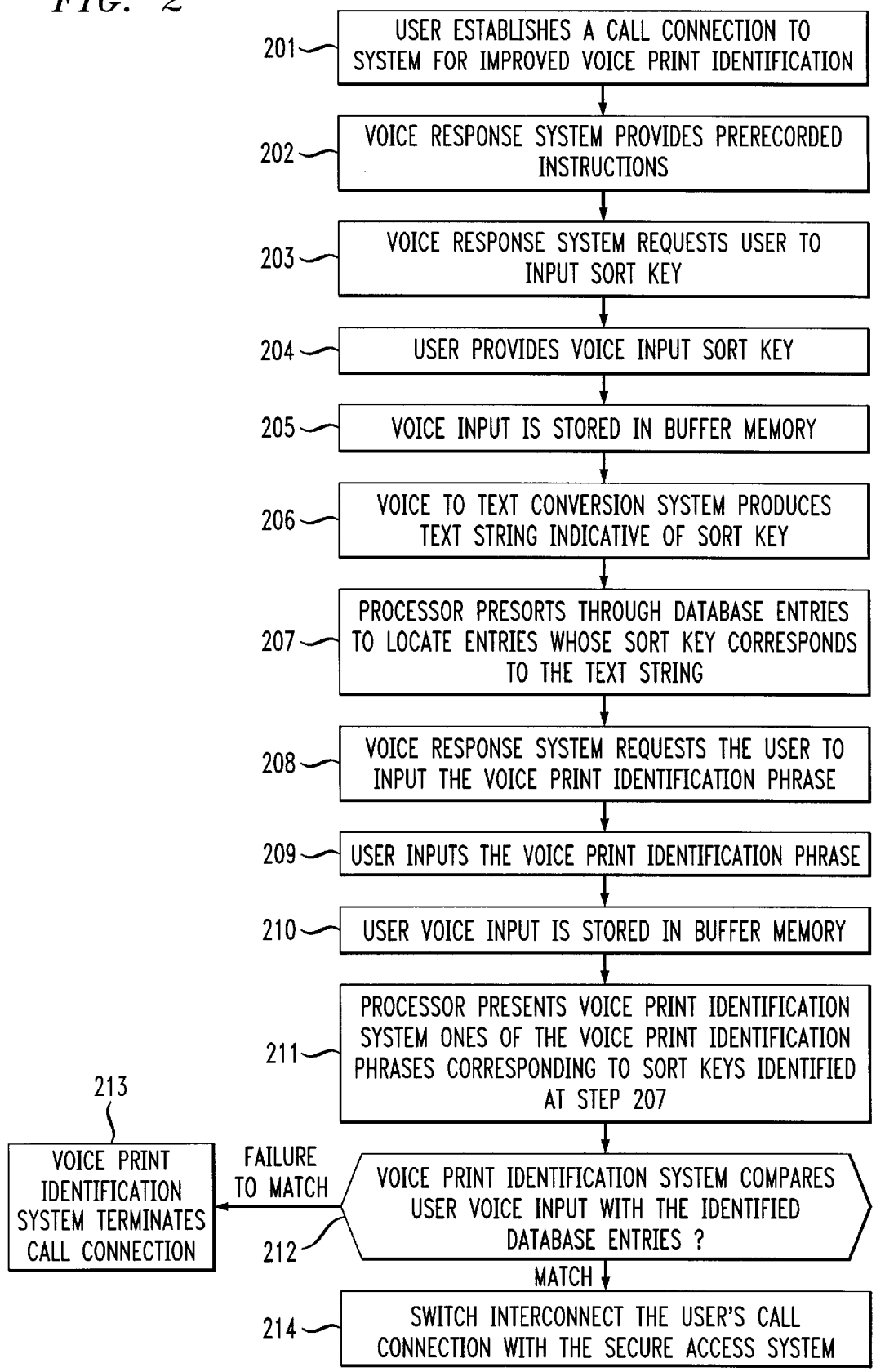
FIG. 2 illustrates In flow diagram form an embodiment of the operation of the present system for improved voice print identification.

FIG. 2 illustrates in flow diagram form an embodiment of the operation of the present system for improved voice print identification 100. In this description, it is assumed that the user who is accessing the system for improved voice print identification 100 has previously registered with the system. This is accomplished in well known fashion by the user storing the required user identification data, including voice information, that is stored in the database 113 for reference in future user accesses of the system for improved voice print identification 100. Therefore, the user access process begins at step 201 when a user establishes a call connection from user terminal Ti through the communication network 103 to an available one of the input ports 101-1 of the system for improved voice print identification 100. The user's call connection is connected to a voice response system 104 at step 202, which provides a prerecorded greeting to the user and instructions on how to access the desired secure access system 102 via the system for improved voice print identification 100. A typical operation includes the voice response system 104 instructing the user to input a sort key, such as the user's name, at step 203. The user at step 204 provides the requested input, in the form of their name spoken into the system for improved voice print identification 100 over the call connection. This user input is typically stored in a buffer memory 114 at step 205 and used by voice to text conversion system 112 to produce a text string at step 206 that is indicative of the user provided input, the sort key. The voice to text conversion system 112 is orders of magnitude faster in operation than the voice print identification system 111, and of sufficient accuracy to produce a useable sort key. The text string output by the voice to text conversion system 112 is used by processor 105 at step 207 to sort through the entries that are stored in database 113, to locate any entries contained therein whose sort key corresponds to the text string produced by the voice to text conversion system 112.

Figure 3:
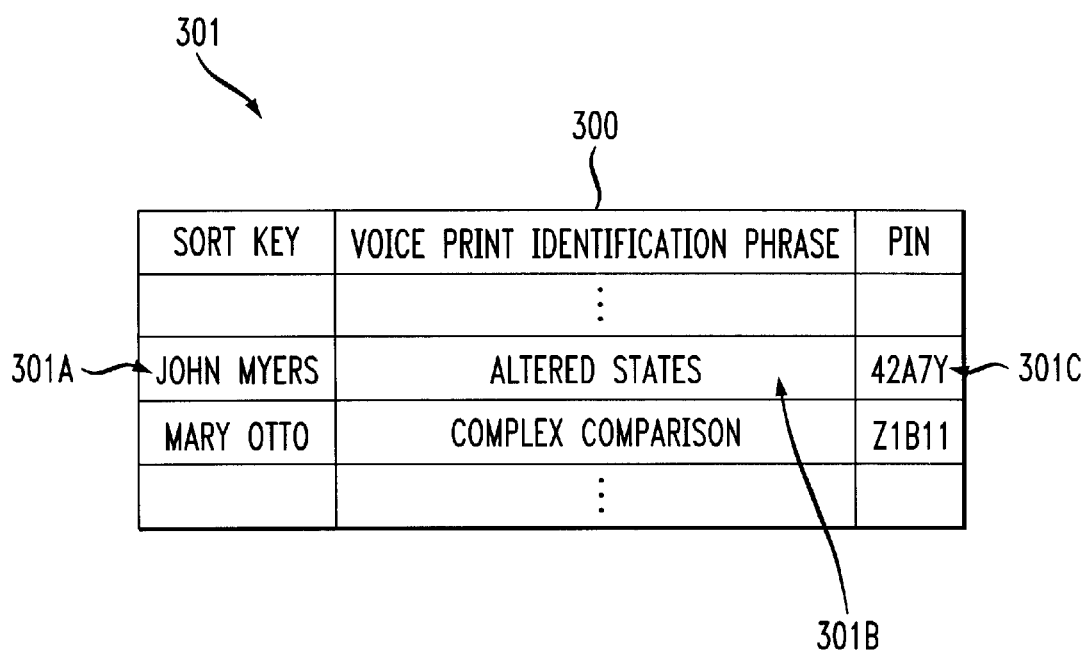
FIG. 3 illustrates a typical database architecture for use with the system for improved voice print identification.

FIG. 3 illustrates a typical database architecture for use with the system for improved voice print identification. In particular, the database 114 comprises a memory in which are stored a plurality of user identity validation data entries. Each of the user identity validation data entries 301 comprise a sort key 301A and a voice print identification phrase 301 B. The sort key 301A is provided by the user, in either voice or text form, and is stored in text searchable form in the database 114. In contrast, the voice print identification phrase 301 B is stored in digitized form in the database 114 in a manner not to lose the user specific characteristics of this voice input. The processor 105 typically would not only look for exact matches between the stored sort keys and the text string output by the voice to text conversion system 112, but also phonetically close entries, to compensate for any inaccuracy in the text generation process. Thus, all sort key entries that differ from the text string by less than a predetermined amount are candidates for the voice print identification process. The accuracy of this presort operation can be regulated by adjusting the doseness of the match that is required for a sort key to be classified as a match candidate. This would still produce only a limited number of matches and serve the purpose of the system for improved voice print identification 100. If no match is determined, the process can either be repeated with a less distinct text comparison, or default to the processing of the voice print identification phrase without presorting the database entries.

The voice response system 104, in response to the database sort operation, provides the next prompt to the user at step 208, requesting the user to input the voice print identification phrase. Alternatively, the voice response system 104 can use the initial user voice input for this process. The user inputs this second segment via the call connection at step 209 and the voice print identification phrase is stored in buffer memory 114 at step 210. Processor 105 at step 211 seriatim presents ones of the voice print identification phrases corresponding to sort keys identified at step 207 to the voice print identification system 111, which uses the presented stored voice print identification phrase at step 212 to compare with the user provided voice print identification phrase until a match is located. The voice print identification system 111 at step 213 then outputs an indication of a match or lack thereof between the user provided voice print identification phrase and the stored benchmark phrase for this user. If there is a failure to match the call connection is terminated at step 213 and access is denied. If a match is determined, then switch 106 is activated at step 214 to interconnect the user's call connection with the secure access system 102.

Alternative Embodiment Details

While the system for improved voice print identification was described as using two distinct elements as the user identity validation data, it is not necessary to provide more than a single such element. For example, the user can prestore their name as the user identity validation data. A text version of this name can function as the sort key while the stored voice input version of the name can serve as the voice print identifying phrase. In addition, further user identification validation data can be used to supplement that described above. The user can be requested to provide a Personal Identification Number (PIN) as verification of their identity, or can be requested to identify which of a plurality of secure access systems, that are concurrently served by the system for improved voice print identification, the user desires to access. The particular details of the system for improved voice print identification can vary as a function of the needs of the secure access system which it serves. For example, the system for improved voice print identification can be used to enable a user to obtain user specific services, without the need for the user to remember specific account numbers. For example, the user can contact a retail store and, by use of the voice print identification process, receive a personalized greeting and be differentiated from other family members who have access to the same account, due to the positive identification provided by this system. This also provides the retail establishment with much greater security from unauthorized credit card purchases.

Summary

The system for improved voice print identification enhances the speed of operation of a voice print identification system by dividing the user identification validation process into two steps: presorting the prestored user identity validation data based upon a user provided voice input to produce a subset of user identity validation data, and processing the identified subset of the user identity validation data using a voice print identification system to validate the identity of the user who is requesting access.

What is claimed:

1. A user identification validation system that verifies the identity of a user who provides a voice input to said user identification validation system, comprising:

means for storing a plurality of user identification data entries, each of said user identification data entries serving to uniquely identifying a particular user and comprising at least one voice input segment provided by said particular user, comprising:

a memory for storing said plurality of user identification data entries, at least one for each of the users who access said user identification validation system;

means for indexing each of said plurality of user identification data entries by a sort key provided by said particular user, means for writing in each of said plurality of user identification data entries a prestored user provided voice input segment;

means, responsive to a service requesting user accessing said user identification validation system, for converting at least a portion of a voice input provided by said service requesting user into a text string;

means for identifying at least one of said plurality of user identification data entries stored in said means for storing that contains data matching said text string; and a voice recognition system that is operational to compare said voice input provided by said service requesting user with said at least one of said plurality of user identification data entries to validate the identity of said service requesting user a memory for storing said plurality of user identification data entries, at least one for each of the users who access said user identification validation system; means for indexing each of said plurality of user identification data entries by a sort key provided by said particular user; and means for writing in each of said plurality of user identification data entries a prestored user provided voice input segment.

2. The user identification validation system of claim 1 wherein said user identification validation system is connected to and interconnects said user and a service providing system, said user identification validation system further comprising:

means, responsive to said voice recognition system matching said voice input provided by said service requesting user with said at least one of said plurality of user identification data entries, for directly connecting said service requesting user with said service providing system.

3. The user identification validation system of claim 1 wherein said means for identifying comprises:

means for generating data indicative of all of said sort keys stored in said memory that substantially match said text string.

4. The user identification validation system of claim 3 wherein said means for identifying further comprises:

means, responsive to said generated data, for presenting said voice recognition system seriatim with each of said user provided voice input segments corresponding to each of said all of said sort keys stored in said memory that substantially match said text string to enable said voice recognition system to identify a match between said voice input provided by said service requesting user with a one of said user provided voice input segments corresponding to each of said all of said sort keys stored in said memory that substantially match said text string.

5. The user identification validation system of claim 4, wherein said user identification validation system is connected to and interconnects said user and a service providing system, said user identification validation system further comprising:

means, responsive to said voice recognition system matching said voice input provided by said service requesting user with said at least one of said plurality of user identification data entries, for directly connecting said service requesting user with said service providing system.

6. The user identification validation system of claim 1 wherein said sort key provided by said particular user comprises said prestored user provided voice input segment, said means for indexing comprises:

means for converting said prestored user provided voice input segment into a text string; and means for storing said text string as said sort key for said particular user.

7. A method of operating a user identification validation system that verifies the identity of a user who provides a voice input to said user identification validation system, comprising the steps of:

storing in a memory a plurality of user identification data entries, each of said user identification data entries serving to uniquely identifying a particular user and comprising at least one voice input segment provided by said particular user, comprising:

indexing each of said plurality of user identification data entries by a sort key provided by said particular user, writing in each of said plurality of user identification data entries a prestored user provided voice input segment;

converting, in response to a service requesting user accessing said user identification validation system, at least a portion of a voice input provided by said service requesting user into a text string;

identifying at least one of said plurality of user identification data entries stored in said means for storing that contains data matching said text string; and operating a voice recognition system to compare said voice input provided by said service requesting user with said at least one of said plurality of user identification data entries to validate the identity of said service requesting user.

8. The method of operating a user identification validation system of claim 7 wherein said user identification validation system is connected to and interconnects said user and a service providing system, said method further comprising the step of:

directly connecting, in response to said voice recognition system matching said voice input provided by said service requesting user with said at least one of said plurality of user identification data entries, said service requesting user with said service providing system.

9. The method of operating a user identification validation system of claim 7 wherein said step of identifying comprises:

generating data indicative of all of said sort keys stored in said memory that substantially match said text string.

10. The method of operating a user identification validation system of claim 9 wherein said step of identifying further comprises:

presenting, in response to said generated data, said voice recognition system seriatim with each of said user provided voice input segments corresponding to each of said all of said sort keys stored in said memory that substantially match said text string to enable said voice recognition system to identify a match between said voice input provided by said service requesting user with a one of said user provided voice input segments corresponding to each of said all of said sort keys stored in said memory that substantially match said text string.

11. The method of operating a user identification validation system of claim 10, wherein said user identification validation system is connected to and interconnects said user and a service providing system, said method further comprising the step of:

directly connecting, in response to said voice recognition system matching said voice input provided by said service requesting user with said at least one of said plurality of user identification data entries, said service requesting user with said service providing system.

12. The method of operating a user identification validation system of claim 7 wherein said sort key provided by said particular user comprises said prestored user provided voice input segment, said step of indexing comprises:

converting said prestored user provided voice input segment into a text string; and storing said text string as said sort key for said particular user.

13. A user identification validation system that verifies the identity of a user who provides a voice input to said user identification validation system, comprising:

a memory for storing a plurality of user identification data entries, each of said user identification data entries serving to uniquely identifying a particular user and comprising at least one voice input segment provided by said particular user:

means for storing a string of text as a sort key in said user identification data entry corresponding to said particular user, which sort key is provided by said particular user;

voice to text conversion means, responsive to a service requesting user accessing said user identification validation system, for converting at least a portion of a voice input provided by said service requesting user into a text string;

means for identifying at least one of said plurality of user identification data entries stored in said memory that contains a sort key that matches said text string comprising:

means for generating data indicative of all of said sort keys stored in said memory that differ from said text string by less than a predetermined amount, means, responsive to said generated data, for presenting said voice recognition system seriatim with each of said user provided voice input segments corresponding to each of said all of said sort keys stored in said memory that substantially match said text string to enable said voice recognition system to identify a match between said voice input provided by said service requesting user with a one of said user provided voice input segments corresponding to each of said all of said sort keys stored in said memory that substantially match said text string; and a voice recognition system that is operational to compare said voice input provided by said service requesting user with said at least one voice input segment that is stored in said at least one of said plurality of user identification data entries to validate the identity of said service requesting user.

14. The user identification validation system of claim 13 wherein said user identification validation system is connected to and interconnects said user and a service providing system, said user identification validation system further comprising:

means, responsive to said voice recognition system matching said voice input provided by said service requesting user with said at least one of said plurality of user identification data entries, for directly connecting said service requesting user with said service providing system.

15. The method of operating a user identification validation system of claim 14 wherein said user identification validation system is connected to and interconnects said user and a service providing system, said method further comprising the step of:

directly connecting, in response to said voice recognition system matching said voice input provided by said service requesting user with said at least one of said plurality of user identification data entries, said service requesting user with said service providing system.

16. A method of operating a user identification validation system that verifies the identity of a user who provides a voice input to said user identification validation system, comprising the steps of:

storing a plurality of user identification data entries in a memory, each of said user identification data entries serving to uniquely identifying a particular user and comprising at least one voice input segment provided by said particular user;

storing a string of text as a sort key in said user identification data entry corresponding to said particular user, which sort key is provided by said particular user;

operating a voice to text conversion apparatus, in response to a service requesting user accessing said user identification validation system, to convert at least a portion of a voice input provided by said service requesting user into a text string;

identifying at least one of said plurality of user identification data entries stored in said memory that contains a sort key that matches said text string, comprising:

generating data indicative of all of said sort keys stored in said memory that differ from said text string by less than a predetermined amount, presenting, in response to said generated data, said voice recognition system seriatim with each of said user provided voice input segments corresponding to each of said all of said sort keys stored in said memory that substantially match said text string to enable said voice recognition system to identify a match between said voice input provided by said service requesting user with a one of said user provided voice input segments corresponding to each of said all of said sort keys stored in said memory that substantially match said text string; and operating a voice recognition system to compare said voice input provided by said service requesting user with said at least one voice input segment that is stored in said at least one of said plurality of user identification data entries to validate the identity of said service requesting user.

* * * * *